(12) United States Patent
Wood

(10) Patent No.: US 11,486,206 B2
(45) Date of Patent: Nov. 1, 2022

(54) CONNECTION ASSEMBLY

(71) Applicant: NATIONAL OILWELL VARCO UK LIMITED, Manchester (GB)

(72) Inventor: Carl Wood, Alford (GB)

(73) Assignee: NATIONAL OILWELL VARCO UK LIMITED, Manchester (GB)

( * ) Notice: Subject to any disclaimer, the term of this patent is extended or adjusted under 35 U.S.C. 154(b) by 272 days.

(21) Appl. No.: 16/858,155

(22) Filed: Apr. 24, 2020

(65) Prior Publication Data

US 2020/0340306 A1 Oct. 29, 2020

(30) Foreign Application Priority Data

Apr. 25, 2019 (GB) ...................................... 1905785

(51) Int. Cl.
| | |
|---|---|
| *E21B 17/043* | (2006.01) |
| *E21B 17/06* | (2006.01) |
| *F16L 17/10* | (2006.01) |
| *F16L 17/02* | (2006.01) |
| *E21B 19/16* | (2006.01) |
| *E21B 19/24* | (2006.01) |

(52) U.S. Cl.
CPC ............ *E21B 17/043* (2013.01); *E21B 17/06* (2013.01); *E21B 19/16* (2013.01); *E21B 19/24* (2013.01)

(58) Field of Classification Search
None
See application file for complete search history.

(56) References Cited

U.S. PATENT DOCUMENTS

| | | | | |
|---|---|---|---|---|
| 3,918,747 | A |   | 11/1975 | Putch |
| 4,124,230 | A | * | 11/1978 | Ahistone .................. F16L 21/08 285/356 |
| 4,124,231 | A | * | 11/1978 | Ahistone .................. F16L 25/08 29/446 |
| 4,124,232 | A | * | 11/1978 | Ahistone .................. F16L 37/62 29/446 |
| 4,902,044 | A | * | 2/1990 | Williams ............ F16L 37/1215 166/344 |
| 6,035,938 | A | * | 3/2000 | Watkins ................ E21B 33/035 166/368 |
| 9,689,211 | B2 |   | 6/2017 | Joensen et al. |
| 9,689,229 | B2 | * | 6/2017 | Hanson ................... E21B 33/14 |

OTHER PUBLICATIONS

"Great Britain Application Serial No. GB1905785.0, Search Report dated Jun. 7, 2019", 4 pgs.
"Great Britain Application Serial No. GB2005914.3, Search Report dated Oct. 12, 2020", 4 pgs.

* cited by examiner

*Primary Examiner* — Matthew Troutman
*Assistant Examiner* — Douglas S Wood
(74) *Attorney, Agent, or Firm* — Schwegman Lundberg & Woessner, P.A.

(57) ABSTRACT

A connection assembly for a well comprises first and second tubular, one of which is adapted to connect to the well, the first tubular having a bore adapted to receive the second tubular. The first and second tubulars lock together, and have first and second seals compressed between an outer surface of the second tubular and an inner surface of the first tubular to create a fluid chamber. The second seal is axially and radially spaced from the first seal. A hydraulic pressure system is adapted to drive hydraulic fluid into the fluid chamber to urge the second tubular out of the first tubular when the first and second seals are compressed between the first and second tubulars. A method of making connections is also disclosed.

20 Claims, 6 Drawing Sheets

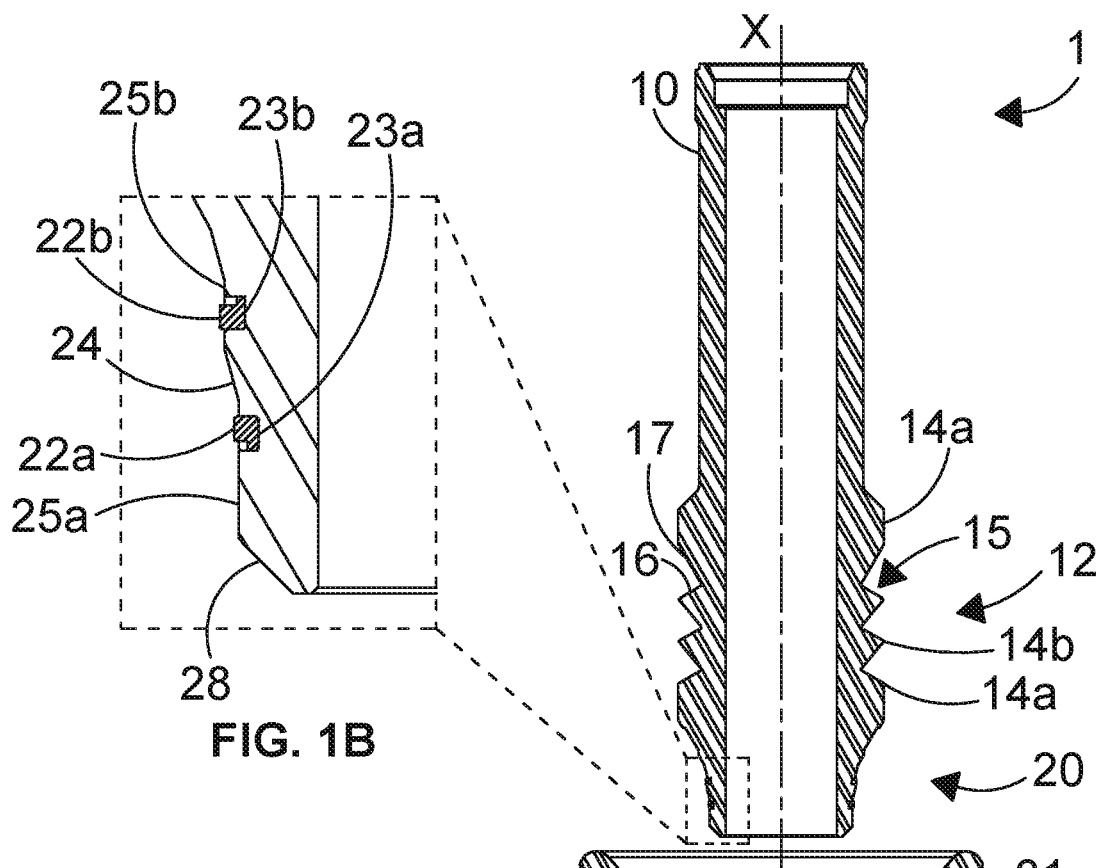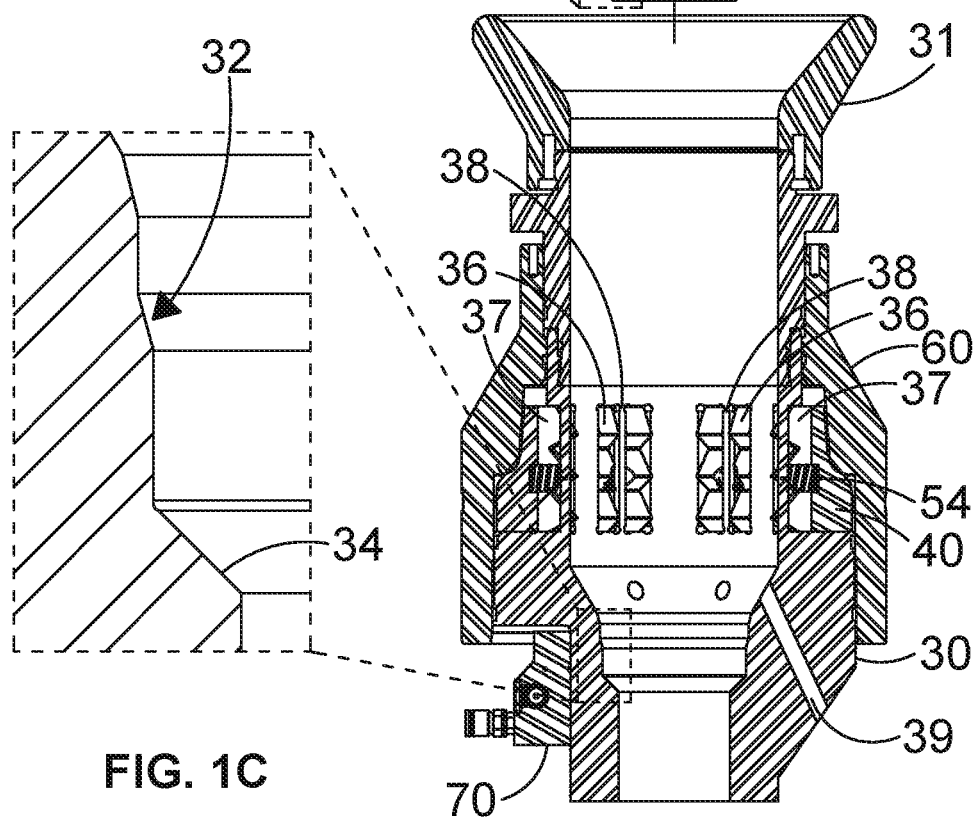

CONNECTION ASSEMBLY

CLAIM OF PRIORITY

This patent application claims the benefit of priority to GB Application Serial No. 1905785.0, filed Apr. 25, 2019, which is incorporated by reference herein in its entirety.

The present invention relates to a connection assembly for an oil or gas well, particularly for joining tubulars carrying high-pressure fluids.

BACKGROUND

Tubular connections to the wellheads of oil or gas wells at the surface are often threaded, flanged or clamped. These types of connections are well-known and reliable, but typically require long makeup or assembly times, and can limit access to the well for purposes such as wireline intervention work and tool delivery and/or retrieval. High-pressure wells, for example those in which hydraulic fracturing methods are used, can impose additional restrictions on wellhead operations due to the use of pressure control equipment.

Various 'quick connect' connection systems for connecting tubulars to wellheads are also known, which are typically hydraulic cam- or collet-connection systems. As well as allowing for relatively short makeup times compared to threaded, flanged or clamped systems, 'quick connect' systems can often be remotely operated, reducing the need for manual intervention by personnel at the wellhead, who might otherwise be exposed to risk from suspended loads typically encountered when making up threaded, flanged or clamped connections. 'Quick connect' systems are also useful in applications where accessibility to the tubular connection is limited. An example is described in U.S. Pat. No. 9,689,211, the disclosure of which is incorporated herein by reference. U.S. Pat. No. 3,918,747 also discloses a well tubular suspension system which is useful for understanding the invention and which is incorporated herein by reference.

SUMMARY

According to the present invention, there is provided a connection assembly for an oil or gas well adapted to contain pressurised fluid within the well, the connection assembly comprising:
  a first tubular having an axis and a second tubular having an axis, one of the first and second tubulars having a coupling device adapted to connect to the well;
  the first tubular having a bore with a first end adapted to receive the second tubular, the second tubular being adapted to connect to the first tubular when the second tubular is received within the first end of the bore of the first tubular;
  a locking device adapted to lock the first and second tubulars together;
  first and second seals disposed on at least one of the first and second tubulars, each of the first and second seals being adapted to form a seal between an outer surface of the second tubular and an inner surface of the first tubular when the second tubular is received within the bore of the first tubular and the first and second tubulars are locked together, to create a fluid chamber defined by the outer surface of the second tubular, the inner surface of the first tubular and the first and second seals;
  wherein the second seal is axially and radially spaced from the first seal; and
  wherein the connection assembly comprises a hydraulic pressure system adapted to drive hydraulic fluid into the fluid chamber to urge the second tubular out of the first tubular when the first and second seals are compressed between the first and second tubulars.

Optionally the hydraulic pressure system comprises a fluid pressure amplifier.

Optionally the hydraulic pressure system is adapted to drive hydraulic fluid into the fluid chamber to urge the second tubular out of the first tubular when the locking device is engaged.

Optionally the hydraulic pressure system comprises a line adapted for transmitting fluid pressure and connected between a pressurised fluid supply such as the fluid pressure amplifier and a port opening into the fluid chamber between the first and second seals.

The fluid pressure amplifier typically has a fluid inlet and a fluid outlet. The pressure amplifier typically increases the pressure of fluid flowing through the fluid inlet before passing the fluid through the fluid outlet at a higher pressure than at the fluid inlet, typically many times higher than the fluid pressure at the fluid inlet. The fluid pressure amplifier typically comprises a pump, such as a hydraulic pump.

The first tubular is optionally adapted to connect to a wellhead, or optionally to a blowout preventer (BOP) or deployable pipeline connection; optionally the coupling device comprises a flange adapted for connection to a flange on a wellhead or BOP or deployable pipeline connection. The second tubular is optionally adapted to connect (optionally to seal) to a tubular string above the connection assembly, such as a wireline intervention string or pumping flow line. The second tubular is optionally an adapter to facilitate the insertion or connection of other tubulars. Optionally the end of the second tubular adapted to be received in the first tubular and to connect thereto (e.g. the lower end) can be an open end. Optionally the opposite end of the second tubular (e.g. the upper end) can be open, allowing communication through the second tubular into the well for fluids and equipment, or the opposite end can optionally be closed in order to occlude or plug the well.

Optionally the first and second seals are disposed on the outer surface of the second tubular, optionally adjacent a first (e.g. lower) axial end of the second tubular. Optionally the first seal is closer to a first (e.g. lower) end of the second tubular than the second seal. Optionally the first and second seals are mutually parallel, and are optionally perpendicular to the axis. Optionally the first and second seals are disposed at axially spaced apart locations on the outer surface of the second tubular. Optionally the outer diameter of the second tubular at the location of the first seal is less than the outer diameter of the second tubular at the location of the second seal. Optionally at least a portion of the outer surface of the second tubular, optionally between the first and second seals, is tapered, optionally radially outwardly tapered from the first seal toward the second seal, and is optionally frusto-conical. Optionally at least a portion of the outer surface (e.g. defining an upper end of the fluid chamber) of the second tubular is tapered at angle of 2 to 45 degrees relative to the axis of the tubular, and optionally at an angle of 4 to 15 degrees. Optionally the said portion of the outer surface is a bevelled surface. The fluid chamber is optionally defined by an upper surface formed by the said portion of the outer surface of the second tubular, and a lower surface formed by a tapered or bevelled portion of the inner surface of the first tubular, optionally parallel to the taper of the outer surface of the second tubular. The sealing area of the first and second seals increases nonlinearly with the sealing radius of the first and second seals, or more particularly, the sealing area of the first and second seals increases with the square of the sealing radius of the first and second seals. Optionally the force with which the second tubular is urged out of the first tubular is proportional to the difference in sealing area of the first and second seals. Optionally the sealing area of the second seal is at least 101% of the sealing area of the first seal, optionally 102-120%, for example, 105-110%. The differential between the sealing area of the first and second seals can be varied in different examples without departing from the scope of the invention. Advantageously, the difference between the sealing areas of the first and second seals is minimised, which optionally maximises the inner diameter of the bore of the second tubular. With higher sealing area differentials, the activating pressure required to load the locking device sufficiently decreases, so with lower sealing area differentials, the activating pressure required to load the locking device can be substantially different from ambient wellbore pressures used to activate other tools, so that unscheduled "kicks" in wellbore pressure that deviate slightly from normal ambient wellbore pressure do not inadvertently load the locking mechanism.

Optionally the first and second seals are disposed in recesses formed in axis-parallel portions of the outer surface of the second tubular, and optionally the first and second seals are removable. Optionally a portion of the outer surface of the second tubular adjacent to the first and second seals is axis-parallel. Optionally the tapered portion of the outer surface of the second tubular between the first and second seals extends between the axis-parallel portions. Optionally each of the first and second seals engages and is adapted to slide axially against an axis-parallel portion of the first tubular (optionally each of the seals is compressed between axis-parallel portions of the first and second tubulars) when the seals are compressed between the first and second tubulars, so that the second tubular can slide axially relative to the first tubular as the seals slide against the axis-parallel portions of the first tubular without unloading the seals.

Optionally the outer surface of the second tubular comprises a shoulder between the first and second seals. Optionally the shoulder is circumferential, and optionally comprises an axially-orientated face that is flat and perpendicular to the axis of the second tubular. Optionally the outer surfaces of the second tubular adjacent to the shoulder are parallel to the axis of the second tubular.

Optionally the outer surface of the second tubular between the first and second seals comprises at least one tapered portion, optionally more than one tapered portion, optionally tapered at different angles. Optionally the outer surface of the second tubular between the first and second seals comprises at least one (or more than one) axis-parallel portion.

Optionally the second tubular is received into the bore of the first tubular, optionally engaging the seals in a throat at a first axial end of the first tubular, by moving the second tubular in an axial direction toward the first tubular. Optionally the second tubular is a sliding fit in the first tubular and is optionally centralised therein. Optionally the greatest inner diameter of the bore of the first tubular is approximately equal to, optionally slightly greater than, the greatest outer diameter of the second tubular. Optionally the bore of the first tubular is adapted to guide the second tubular in an axial direction, optionally to align the axes of the first and second tubulars, as the second tubular is moved into the bore of the first tubular. Optionally the bore of the first tubular substantially prevents radial movement of the second tubular as it is moved into the bore of the first tubular.

Optionally the bore of the first tubular comprises one or more seating surfaces which optionally abut one or more corresponding surfaces of the second tubular when the second tubular is seated within the bore of the first tubular. Optionally one or more of the seating surfaces of the first tubular is perpendicular to the axes of the first and second tubulars. Optionally one or more of the seating surfaces is angled, optionally tapered, optionally tapered radially outwardly, e.g. toward the throat of the first tubular. Optionally the taper of at least one seating surface of the first tubular is substantially equal and opposite to (optionally tapered at the same angle as) the taper of the corresponding surface of the second tubular which it abuts. Optionally the one or more seating surfaces of the first tubular prevent further axial movement of the second tubular into the bore of the first tubular when the second tubular is seated on the seating surfaces.

Optionally when the second tubular is seated within the bore of the first tubular and the locking device is engaged, at least a portion of the outer surface of the second tubular between the first and second seals is separated from the corresponding inner surface of the first tubular. Optionally the respective inner and outer surfaces of the first and second tubulars are separated uniformly between the first and second seals; or in other words, optionally at least a portion of the respective inner and outer surfaces of the first and second tubulars are mutually parallel. In many examples the fluid chamber created between the first and second seals is formed between equally tapered, parallel portions of the inner and outer surfaces of the first and second tubulars respectively, but in other examples, one or both of the surfaces of the first and second tubulars can have any shape that creates a fluid chamber between the first and second seals. For example, the surfaces may be tapered at different angles to each other, or incorporate curved portions, or comprise axially separated shoulders that form a cavity between them.

Optionally the locking device comprises a locking profile on the outer surface of the second tubular, which is optionally axially spaced from the first and second seals. Optionally the first and second seals are disposed closer to the first (e.g. lower) axial end of the second tubular than the locking profile, i.e. between the locking profile and the first axial end. Optionally the locking profile extends at least partway around the outer surface of the second tubular, and optionally surrounds it.

Optionally the locking profile has one or more axially spaced, outwardly extending protrusions, and optionally the outwardly extending protrusions form one or more recesses in the surface of the locking profile. Optionally the outwardly extending protrusions, and optionally the recesses, are circumferential around the outer surface of the second tubular. Optionally the one more recesses have generally the same shape and dimensions, optionally with the same minimum outer diameter in the base of each recess, and optionally each protrusion has the same greatest outer diameter. Optionally the greatest outer diameter of the one or more protrusions is also the greatest outer diameter of the outer surface of the second tubular. Optionally each recess forms two tapered faces which extend radially outwardly from the base of each recess. Optionally a first face of each recess, closer to the first axial end of the second tubular, has a relatively steep angle relative to the axis of the second tubular, optionally greater than 45 degrees, and optionally approaching perpendicular to the axis of the second tubular. Optionally a second face of each recess, closer to the opposing second (e.g. upper) axial end of the second tubular, has a relatively shallow angle relative to the axis of the second tubular (e.g. shallower than angle of the first face), optionally less than 45 degrees, and optionally approaching parallel to the axis of the second tubular.

Optionally the locking device further comprises one or more keys, each of which is optionally adapted to engage with the locking profile of the second tubular. Optionally the keys are coupled to the first tubular. Optionally the keys are moveable, optionally generally radially, with respect to the first tubular. Optionally the keys are spaced around a circumference of the first tubular, optionally regularly spaced, optionally symmetrically spaced, optionally equidistantly spaced, and optionally arranged in diametrically opposed pairs. Optionally the keys are disposed in windows extending radially through the wall of the first tubular. Optionally the keys have a radially retracted configuration and a radially extended configuration. When the keys are in the radially retracted configuration they are optionally outside the bore of the first tubular, and when the keys are in the radially extended configuration at least a portion of each key is optionally inside the bore of the first tubular. Optionally the keys are able to move radially with respect to the axis of the first tubular, but are constrained against axial movement with respect to the first tubular. Optionally the keys are a sliding fit in the windows.

Optionally a radially inner face of each key engages with the locking profile of the second tubular, optionally when the keys are in the radially extended configuration. Optionally the profile of the radially inner face of each key is adapted to interlock with the locking profile of the second tubular. Optionally the radially inner face of each key comprises one or more outwardly extending protrusions, optionally teeth, and optionally the outwardly extending protrusions form one or more recesses between adjacent protrusions in the radially inner surface of each key. Optionally each recess forms two tapered faces which extend radially inwardly when the one or more keys are coupled to the first tubular. Optionally a first face of each recess has a relatively shallow angle relative to the axis of the first tubular, optionally less than 45 degrees, optionally at an equal and opposite angle to the corresponding second face of each recess of the locking profile of the second tubular. Optionally a second face of each recess has a relatively steep angle relative to the axis of the first tubular, optionally more than 45 degrees, optionally at an equal and opposite angle to the corresponding first face of each recess of the locking profile of the second tubular.

Optionally the radially inner face of each key cooperates with the locking profile of the second tubular to translate radial movement of each key into axial movement of the second tubular relative to the first tubular. Optionally as the one or more keys move radially from the retracted position to the extended position, the second tubular is urged further into the bore of the first tubular, optionally until the second tubular is seated on the seating surface(s) of the first tubular.

Optionally a radially outer face of each key comprises a driving face. Optionally the driving face of each key comprises two or more portions, optionally three portions e.g. ramps. Optionally a first portion of the driving face of each key, optionally adjacent to a first axial end of each key when the key is coupled to the first tubular, is tapered relative to the axis of the first tubular, optionally at an angle of 2 to 20 degrees to the axis of the first tubular. Optionally a second portion of the driving face, optionally adjacent to the first portion, is also tapered, optionally at a relatively steeper angle to the first portion, optionally at an angle of 5 to 45 degrees. Optionally the second portion is ramped at a different angle than the first portion, e.g. closer to the axis of the first tubular. Optionally a third portion of the driving face, optionally adjacent to the second opposing axial end of each key, is substantially parallel to the axis of the first tubular.

Optionally the one or more keys are biased toward the radially retracted configuration, optionally by one or more biasing devices, optionally by one or more springs, optionally by one spring per key. Optionally a portion (e.g. a first end) of each spring is disposed within a recess of each key, and optionally the opposing end of each spring is compressed against an outer surface of the first tubular. Optionally when the keys are driven from the radially retracted configuration to the radially extended configuration the one or more springs are compressed. Optionally when the keys are not driven, the one or more springs bias the keys toward the radially retracted configuration.

Optionally the first tubular further comprises a driving mechanism, optionally a sleeve, optionally a piston sleeve. Optionally the sleeve has a locked configuration and an unlocked configuration. Optionally the sleeve moves between the locked and unlocked configurations, optionally along an outer surface of the first tubular, optionally in an axial direction. Optionally the sleeve extends partway around the first tubular, and optionally surrounds it. Optionally the sleeve is cylindrical.

Optionally the sleeve drives the keys. Optionally axial movement of the sleeve causes radial movement of the keys. Optionally when the sleeve is in the unlocked configuration, the keys are in the radially retracted configuration, and optionally when the sleeve is in the locked configuration, the keys are in the radially extended configuration. Optionally the sleeve has a driving face which engages with the driving faces of the one or more keys. Optionally the driving face of the sleeve abuts a first portion of the driving face of each key, optionally when the sleeve is in the unlocked configuration and the keys are in the radially retracted configuration. Optionally the driving face of the sleeve abuts a second portion of the driving face of each key, optionally when the sleeve is in the locked configuration and the keys are in the radially extended configuration. Optionally as the sleeve is actuated from the unlocked configuration to the locked configuration, the driving face of the sleeve slides from the first portion of the driving face of each key, optionally across the third portion of the driving face of each key, optionally to the second portion of the driving face of each key. Optionally as the driving face of the sleeve moves across the more steeply tapered third portion of the driving face of each key, there is an increase in the radial rate of displacement of the one or more keys, corresponding to an increase in the axial rate of displacement of the second tubular in the bore of the first tubular.

Optionally the movements of the sleeve, keys and second tubular are concurrent. Optionally movement, optionally axial movement, of the sleeve causes movement, optionally radial movement of the keys, which optionally causes movement, optionally axial movement of the second tubular. Optionally the axial movement of the sleeve and second tubular are in the same axial direction.

Once the second tubular is seated in the bore of the first tubular, the sleeve is in the locked configuration and the one or more keys are in the radially extended configuration, a fluid, optionally a liquid, optionally a hydraulic fluid, can be driven (e.g. pumped) into the fluid chamber formed by the axial and radial separation of the first and second seals. Optionally the first or second tubular (ideally the first tubular) incorporates a fluid port opening into the chamber, which connects a fluid delivery line from the hydraulic pressure system. Optionally the fluid delivery line connects the port in the chamber with a port on an outer surface of the first tubular that communicates with a manifold. Optionally the fluid is driven into the fluid chamber from a fluid supply, optionally a hydraulic fluid supply. Optionally increasing the pressure in the fluid chamber increases pressure on the first and second seals, allowing integrity testing of the first and second seals. Optionally the hydraulic pressure system incorporates a gauge to measure pressure in the chamber to identify leaks at this stage. Optionally increasing the pressure in the fluid chamber to urge the second tubular out of the bore of the first tubular allows the operator to carry out a lock load test to verify that the locking device, optionally the sleeve and the one or more keys, is in the locked configuration, and optionally that the locking device is engaged to lock the first and second tubulars together, if pressure is maintained in the fluid chamber. Optionally the pressure in the fluid chamber during the lock load test causes sufficient axial thrust on the second tubular to lift the second tubular when seated within the bore of the first tubular, and optionally separate the first seal, and optionally the second seal, from the inner surface of the bore of the first tubular if the locking device is improperly engaged. Optionally the pressure in the fluid chamber is monitored, optionally using the gauge incorporated in the hydraulic pressure system, during the lock load test. Optionally a change, optionally a reduction, of the pressure in the fluid chamber during the lock load test indicates that at least one, optionally both, of the first and second seals have separated from the inner surface of the first tubular, which optionally indicates movement of the second tubular relative to the first tubular, and which optionally further indicates improper or failed engagement of the locking device. Optionally substantially constant pressure in the fluid chamber during the lock load test indicates that neither of the first and second seals have separated from the inner surface of the first tubular, which optionally indicates that the second tubular has remained substantially stationary relative to the first tubular, and which optionally further indicates proper engagement of the locking device.

Optionally the hydraulic fluid supply is pressurised, optionally to a pressure greater than the maximum working pressure (MWP) of the oil or gas well, optionally to a pressure approximately equal to, or optionally greater than, 115% of MWP. Optionally the hydraulic fluid supply is pressurised to more than 10,000 psi, optionally to around 15,000 psi. Optionally the hydraulic fluid supply for the fluid chamber is pressurised to a sufficient pressure for the force acting upon the second tubular in a first direction out of the bore of the first tubular is balanced with, or optionally greater than, the axial thrust force acting on the second tubular in a second opposing direction due to gravity, optionally due to the weight of the second tubular. Optionally the hydraulic fluid supply for the fluid chamber is pressurised to a pressure less than a first threshold pressure at which the axial thrust force acting on the second tubular against the locking device would compromise the structural integrity of the keys, which provides the advantage of reducing design constraints on the size, shape and material strength of the keys. Optionally the hydraulic fluid supply for the fluid chamber is pressurised to a pressure less than a second threshold pressure at which the pressure differential between the bore and the outer surface of the second tubular would compromise the structural integrity of the second tubular, which provides the further advantage that the wall thickness of the second tubular can be minimised, and therefore the inner diameter of the bore of the second tubular can be maximised.

Optionally the sleeve is hydraulically-actuated. Optionally the sleeve is driven from a hydraulic fluid supply, optionally from the same hydraulic fluid supply as that of the fluid chamber, optionally from a different hydraulic fluid supply to that of the fluid chamber. Optionally the hydraulic fluid supply for the sleeve is a lower pressure than that of the fluid chamber. Optionally the hydraulic fluid supply for the sleeve has a pressure of 1,000 to 5,000 psi, optionally around 3,000 psi.

Once the fluid chamber has been pressurised, optionally to test the first and second seals, optionally to indicate that the locking device is engaged to lock the first and second tubulars, optionally the pressure in the fluid chamber is maintained during operations of the assembly. Optionally maintaining pressure in the fluid chamber urges the second tubular against the locking device, optionally loading the keys. Optionally urging the second tubular against the locking device reduces, optionally prevents, undesirable movement, optionally vibration, of the second tubular against the locking device, optionally during routine well operations.

The invention also provides a method of making connections in an oil or gas well connection assembly, the connection assembly comprising:

first and second tubulars each having an axis, one of the first and second tubulars having a coupling device adapted to connect to the well, the first tubular having a bore with a first end being adapted to receive the second tubular:

a locking device adapted to lock the first and second tubulars together;

first and second seals disposed on at least one of the first and second tubulars, each of the first and second seals being adapted to form a seal between an outer surface of the second tubular and an inner surface of the first tubular when the second tubular is received within the bore of the first tubular and the first and second tubulars are locked together, to create a fluid chamber defined by the outer surface of the second tubular, the inner surface of the first tubular and the first and second seals;

wherein the second seal is axially and radially spaced from the first seal to create a fluid chamber between the first and second seals;

wherein the method comprises receiving the second tubular in the first tubular, engaging the locking device to lock the first and second tubulars together, and driving hydraulic fluid into the fluid chamber to urge the second tubular out of the first tubular.

The invention also provides a method of connecting tubulars in a connection assembly for an oil or gas well, the connection assembly having a bore, the connection assembly comprising:

a locking device actuatable between a locked configuration and an unlocked configuration; and a control device adapted to actuate the locking device between the locked and unlocked configurations; wherein the control device prevents actuation of the locking device between the locked configuration and the unlocked configuration when well pressure in the bore of the connection assembly is greater than a threshold pressure, and wherein the control device allows actuation of the locking device from the locked to the unlocked configuration when the well pressure in the bore of the connection assembly is not greater than the threshold pressure.

According to another aspect of the present invention, there is provided a connection assembly for an oil or gas well, the connection assembly having a bore adapted to contain well pressure, the connection assembly comprising a control device, and a locking device actuatable between a locked configuration and an unlocked configuration, wherein the control device is adapted to prevent actuation of the locking device between the locked configuration and the unlocked configuration when well pressure in the bore of the connection assembly is greater than a threshold pressure, and wherein the control device is adapted to allow actuation of the locking device from the locked to the unlocked configuration when the well pressure in the bore of the connection assembly is not greater than the threshold pressure.

Optionally the control device is adapted to allow actuation of the locking device from the locked to the unlocked configuration when the well pressure in the bore of the connection assembly is less than or equal to the threshold pressure.

Optionally the control device comprises first and second ports, and optionally the control device is in communication, optionally fluid communication, with the bore of the connection assembly, optionally through a signal pathway, part of which optionally comprises a fluid channel. Optionally the second port of the control device is connected to the locking device, optionally by a conduit, optionally by a fluid line. Optionally the locking device is actuated hydraulically. Optionally hydraulic fluid, optionally pressurised hydraulic fluid, passes from the first port to the second port of the control device to actuate the locking device, optionally from the locked configuration to the unlocked configuration. Optionally the first port communicates with the second port when the well pressure in the bore of the connection assembly is not greater than, optionally less than or equal to, the threshold pressure. Optionally the control device comprises an interlock device which optionally isolates the first port from the second port when the well pressure in the bore of the connection assembly is greater than the threshold pressure. Optionally the threshold pressure is from 50 psi to 100 psi.

Optionally the control device comprises third and fourth ports, and optionally the fourth port of the control device is connected to the locking device, optionally by a conduit, optionally by a fluid line. Optionally hydraulic fluid, optionally pressurised hydraulic fluid, passes from the third port to the fourth port of the control device to actuate the locking device, optionally from the unlocked configuration to the locked configuration. Optionally the control device comprises a check valve which is optionally in communication, optionally fluid communication, optionally mechanical communication, with the interlock device. Optionally the check valve prevents the locking device from leaving the locked configuration, optionally by locking hydraulic pressure in the connection between the control device and the locking device, optionally when the interlock device prevents release of the check valve, optionally when the well pressure in the bore of the connection assembly is greater than the threshold pressure.

The various aspects of the present invention can be practiced alone or in combination with one or more of the other aspects, as will be appreciated by those skilled in the relevant arts. The various aspects of the invention can optionally be provided in combination with one or more of the optional features of the other aspects of the invention. Also, optional features described in relation to one aspect can typically be combined alone or together with other features in different aspects of the invention. Any subject matter described in this specification can be combined with any other subject matter in the specification to form a novel combination.

Various aspects of the invention will now be described in detail with reference to the accompanying Figures. Still other aspects, features, and advantages of the present invention are readily apparent from the entire description thereof, including the Figures, which illustrates a number of exemplary aspects and implementations. The invention is also capable of other and different examples and aspects, and its several details can be modified in various respects, all without departing from the spirit and scope of the present invention. Accordingly, each example herein should be understood to have broad application, and is meant to illustrate one possible way of carrying out the invention, without intending to suggest that the scope of this disclosure, including the claims, is limited to that example. Furthermore, the terminology and phraseology used herein is solely used for descriptive purposes and should not be construed as limiting in scope. In particular, unless otherwise stated, dimensions and numerical values included herein are presented as examples illustrating one possible aspect of the claimed subject matter, without limiting the disclosure to the particular dimensions or values recited. All numerical values in this disclosure are understood as being modified by "about". All singular forms of elements, or any other components described herein are understood to include plural forms thereof and vice versa.

Language such as "including", "comprising", "having", "containing", or "involving" and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Thus, throughout the specification and claims unless the context requires otherwise, the word "comprise" or variations thereof such as "comprises" or "comprising" will be understood to imply the inclusion of a stated integer or group of integers but not the exclusion of any other integer or group of integers.

Any discussion of documents, acts, materials, devices, articles and the like is included in the specification solely for the purpose of providing a context for the present invention. It is not suggested or represented that any or all of these matters formed part of the prior art base or were common general knowledge in the field relevant to the present invention.

In this disclosure, whenever a composition, an element or a group of elements is preceded with the transitional phrase "comprising", it is understood that we also contemplate the same composition, element or group of elements with transitional phrases "consisting essentially of", "consisting", "selected from the group of consisting of", "including", or "is" preceding the recitation of the composition, element or group of elements and vice versa. In this disclosure, the words "typically" or "optionally" are to be understood as being intended to indicate optional or non-essential features of the invention which are present in certain examples but which can be omitted in others without departing from the scope of the invention.

References to directional and positional descriptions such as upper and lower and directions e.g. "up", "down" etc. are to be interpreted by a skilled reader in the context of the examples described to refer to the orientation of features shown in the drawings, and are not to be interpreted as limiting the invention to the literal interpretation of the term, but instead should be as understood by the skilled addressee.

BRIEF DESCRIPTION OF THE DRAWINGS

In the accompanying drawings:
FIGS. 1A, 1B and 1C are respectively section and detailed section views of an example of a connection assembly;
FIGS. 50 and 5D depict different sections of the fluid chamber between the seals shown FIG. 5A.

DETAILED DESCRIPTION OF THE DRAWINGS

Figure 2A:
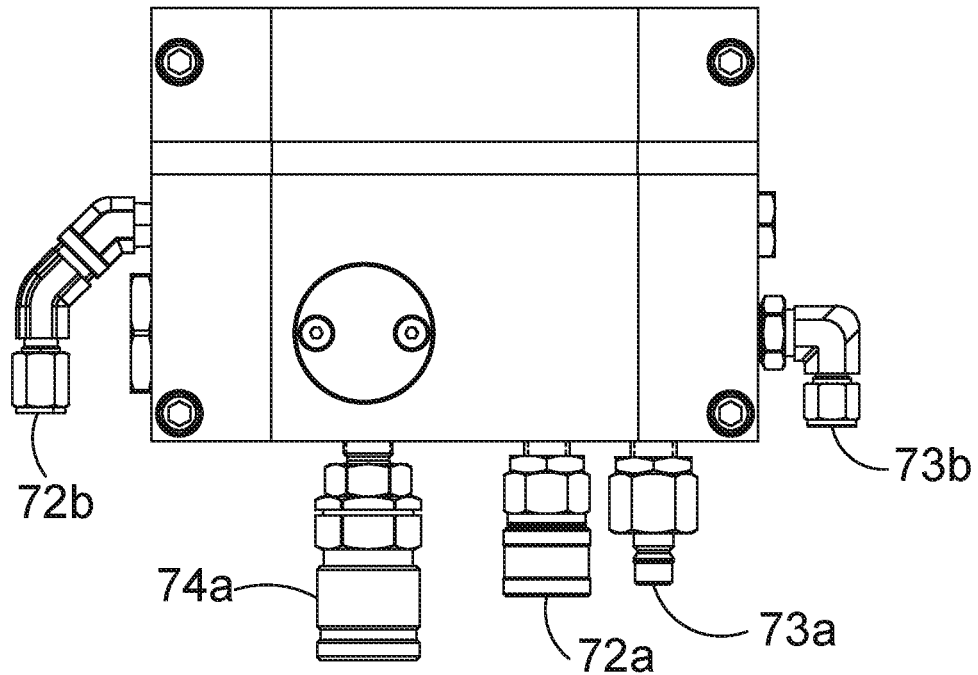
FIGS. 2A and 2B are front and rear elevation views of the hydraulic manifold block of the connection assembly shown in FIG. 1A.

Referring now to the drawings, a connection assembly 1 in accordance with one example of the invention is shown in FIG. 1A. The connection assembly 1 comprises an upper body 10 and a lower body 30. Both the upper and lower bodies 10, 30 are generally cylindrical, and each has a central bore with an axis X. The inner diameter of a portion of the bore of the lower body 30 is approximately equal to the outer diameter of the upper body 10, so that the upper body 10 can be received within the bore of the lower body 30 in a sliding fit. When the upper body 10 is received in the bore of the lower body 30, the bore of the upper body is coaxial with the bore of the lower body 30.

The lower body also comprises a piston sleeve 60 and locking keys 50. In this example the piston sleeve 60 moves axially along an outer surface of the lower body 30, and drives the locking keys 50 radially through the wall of the lower body 30. When the upper body 10 is received into the bore of the lower body 30, the piston sleeve 60 drives the locking keys 50 into engagement with the lower body 30. When the locking keys 50 have engaged with the lower body 30, the upper and lower bodies 10, 30 are locked, and relative axial movement of the upper and lower bodies is prevented.

In this example the piston sleeve 60 is actuated hydraulically, and is connected to a manifold block 70 which controls feed of hydraulic fluid to the piston sleeve and other components of the assembly. The manifold block 70 is connected to an external source of hydraulic pressure, and in this example the manifold block has two ports to which external hydraulic pressure is applied in order to actuate the piston sleeve 60 in both axial directions along the outer surface of the lower body 30.

As is best seen in FIG. 1A, the bore of the upper body 10 has a generally constant inner diameter, but in other examples the inner diameter of the bore may vary over the axial length of the upper body 10. Also in this example the upper body 10 has a generally constant outer diameter, and therefore radial thickness, toward a second axial end opposing the first axial end of the upper body 10 that is received into the bore of the lower body 30. A locking profile 12 is disposed on the outer surface of the upper body 10 toward the first (lower) axial end, in an increased wall thickness region of the upper body 10. A bevelled seating face 28 is disposed adjacent the first axial end of the upper body 10, and a sealing surface 20 is disposed between the locking profile 12 and bevelled seating face 28.

In this example, the locking profile 12 consists of four raised protrusions or ridges 14 arranged axially along the outer surface of the upper body 10, each of which extends circumferentially around the outer surface of the upper body. In other examples there could be more or fewer than four protrusions. In this example the two axially outermost protrusions 14 have flat radially outermost surfaces which are parallel to the axis X of the upper body 10, but in other examples they may have a different shape of apex, for example tapered or curved or pointed. Also in this example the two axially innermost protrusions 14 are peaked at their radially outermost extent, and have a general sawtooth profile when viewed in side section, as best seen in FIG. 1A. Further in this example, both the axially innermost peaked protrusions and the axially outermost flattened protrusions all have approximately equal maximum outer diameter.

The four circumferential protrusions 14 of this example form three circumferential recesses 15 in the outer surface of the upper body 10. Each recess 15 has two tapered faces 16, 17 which extend radially outwardly from the base of each recess a first face 16 which tapers out toward the first axial end of the upper body 10, and a second face 17 which tapers out toward the opposing second axial end of the upper body. In this example each first face 16 is tapered relative to the axis X of the upper body 10 at an angle greater than 45 degrees, and each second face 17 is tapered relative to the axis X of the upper body 10 at an angle of less than 45 degrees. Therefore, in this example, since all protrusions 14 have approximately equal maximum outer diameter, the axial dimension of each first face 16 is less than the axial dimension of each second face 17.

The sealing surface 20 of the upper body 10 in this example comprises a region of decreasing wall thickness of the upper body, toward the first axial end of the upper body. In other words, the sealing surface 20 generally tapers radially inwardly from an axially outermost flattened protrusion 14a to the bevelled seating face 28 adjacent the first axial end of the upper body 10. First and second seals 22a, 22b, which in this example are annular seals optionally formed from elastomeric material, are disposed in seal recesses 23a, 23b in the sealing surface 20. Both the seal recesses 23a, 23b and seals 22a, 22b are arranged perpendicularly to the axis X of the upper body 10. The seal recesses 23a, 23b, and therefore the seals 22a, 22b, are axially separated in the sealing surface 20, and are therefore also radially separated, due to the generally inward taper of the sealing surface 20. In this example the second (in this case, upper) seal 22b has a sealing area of approximately 105% of the first (in this case, lower) seal 22a. In other examples, the ratio of the sealing areas of the first and second seals may be different to those found in this example.

In this example, two portions 25a, 25b of the sealing surface 20 immediately adjacent the seal recesses 23a, 23b are parallel to the axis X of the upper body 10, and an intermediate portion 24 of the sealing surface between the seal recesses 23a, 23b is tapered, as is best seen in FIG. 1B. Therefore, in this example, the axial and radial separation of the seals 22a, 22b is defined by the axial dimension i.e. length, and radial dimension i.e. angle relative to the axis X of the tapered surface 24.

The inner diameter of the bore of the lower body 30 in this example is generally a sliding fit with the outer diameter of the flattened protrusions 14a of the upper body 10. In this example the bore of the lower body 30 is widened at a first axial end of the lower body by the addition of an entry guide 31, which is not an integral part of the lower body, but can be joined to the first axial end of the lower body to initially guide the upper body 10 into the bore of the lower body. The bore of the lower body 30 also has a sealing surface 32 and seat 34 in a generally tapered portion of the bore disposed toward an opposing (in this case, upper) second axial end of the lower body, as is best seen in FIG. 1C. The sealing surface 32 and seat 34 of the lower body 30 which engage respectively with the sealing surface 20 and seating face 28 of the upper body 10. In this example the seat 34 is tapered at an angle equal and opposite to the angle of the taper of the seating face 28, so that the surfaces of the seating face 28 and seat 34 are substantially coplanar when the upper body 10 is seated inside the bore of the lower body 30. The respective sealing surfaces 20, 32 of the upper and lower bodies 10, 30 are not coplanar, or in other words do not contact each other, but are generally parallel to each other.

In this example the lower body 30 has six apertures or windows 36 arranged equidistantly and circumferentially around the outer surface of the lower body, and which extend through the wall of the lower body. Also in this example the windows 36 are disposed in recesses 37 formed in a reduced wall thickness region of the lower body, axially adjacent to tapered sealing surface 32 of the lower body. In other examples, there may be more or fewer than six windows, and the windows need not be arranged either circumferentially or equidistantly. Also in this example, each window 36 through the lower body 30 is bisected by a narrow dividing member or web 38 of the lower body which extends through the middle of each window in a direction parallel to the axis X.

In this example six locking keys 40 are disposed in each of the six windows 36 of the lower body 30. Each locking key 40 has an inner face 42 orientated radially inwards toward the bore of the lower body 30, and an outer face 43 oriented radially outwardly. In this example the inner face 42 comprises a locking profile, an axial recess 44 (not shown in the Figures) and a circular recess 45. The circular recess 45 is generally disposed in the centre of the inner face 42, and intersects with the axial recess 44. Also in this example the inner face 42 of each locking key 40 comprises three raised protrusions or teeth 46, which engage with the three recesses 15 of the locking profile 12 of the upper body 10, but in other examples there may be more or fewer than three teeth. Each tooth 46 has two tapered faces which extend radially outwardly from the tip of each tooth: a first face 48 which tapers out toward the first axial end of the lower body 30, and a second face 49 which tapers out toward the opposing second axial end of the lower body. In this example each first face 48 is tapered relative to the axis of the lower body 30 at an angle less than 45 degrees, and each second face 49 is tapered relative to the axis of the lower body 30 at an angle of more than 45 degrees.

Also in this example the outer face 43 of each locking key 40 consists of two driving faces 50a, 50b, and a third face 51. The two driving faces 50a, 50b are tapered relative to the axis of the lower body 30, and the third face 51 is generally axis-parallel with the axis of the lower body 30. The first tapered driving face 50a is disposed adjacent to a first axial end of each locking key 40, and is tapered at a shallow angle relative to the axis of the lower body 30. The second tapered driving face 50b is disposed midway between the first and third faces 50a, 51, and is tapered at a steeper angle relative to the taper of the driving face 50a. The third generally axis-parallel face 51 is disposed adjacent to the opposing second axial end of the locking key 40 from the first driving face 50a.

A spring 54 is disposed within the circular recess 45 of each locking key 40, and is compressed between each locking key 40 and the corresponding strip 38 of each window 36.

The piston sleeve 60 in this example is generally cylindrical and extends circumferentially around the outer surface of the lower body 30. Also in this example the inner surface of the piston sleeve 60 is in sealing contact with the outer surface of the lower body 30 on both axial sides of the windows 36. Seals between the inner surface of the piston sleeve 60 and the outer surface of the lower body 30 form two annular sealed cavities 62a, 62b, shown in FIG. 5A, which are disposed adjacent to both axial ends of the windows 36. The sealed cavities 62a, 62b are joined by fluid conduits and jumper hoses (not shown in the Figures) to the manifold block 70, as will be described in more detail below.

In this example the inner surface of the piston sleeve 60 is radially separated from the outer surface of the lower body 30 between the sealed cavities 62a, 62b and forms an annular chamber 64 which contains the locking keys 40 in the windows 36 of the lower body. Also in this example a circumferential portion of the inner surface of the piston sleeve 60 within the annular chamber 64 forms a driving face 66. The driving face 66 comprises a generally rounded shoulder on the inner surface of the piston sleeve 60, disposed between two generally axis-parallel portions 67a, 67b of the inner surface of the piston sleeve.

Figures 4A, 4B, 4C:
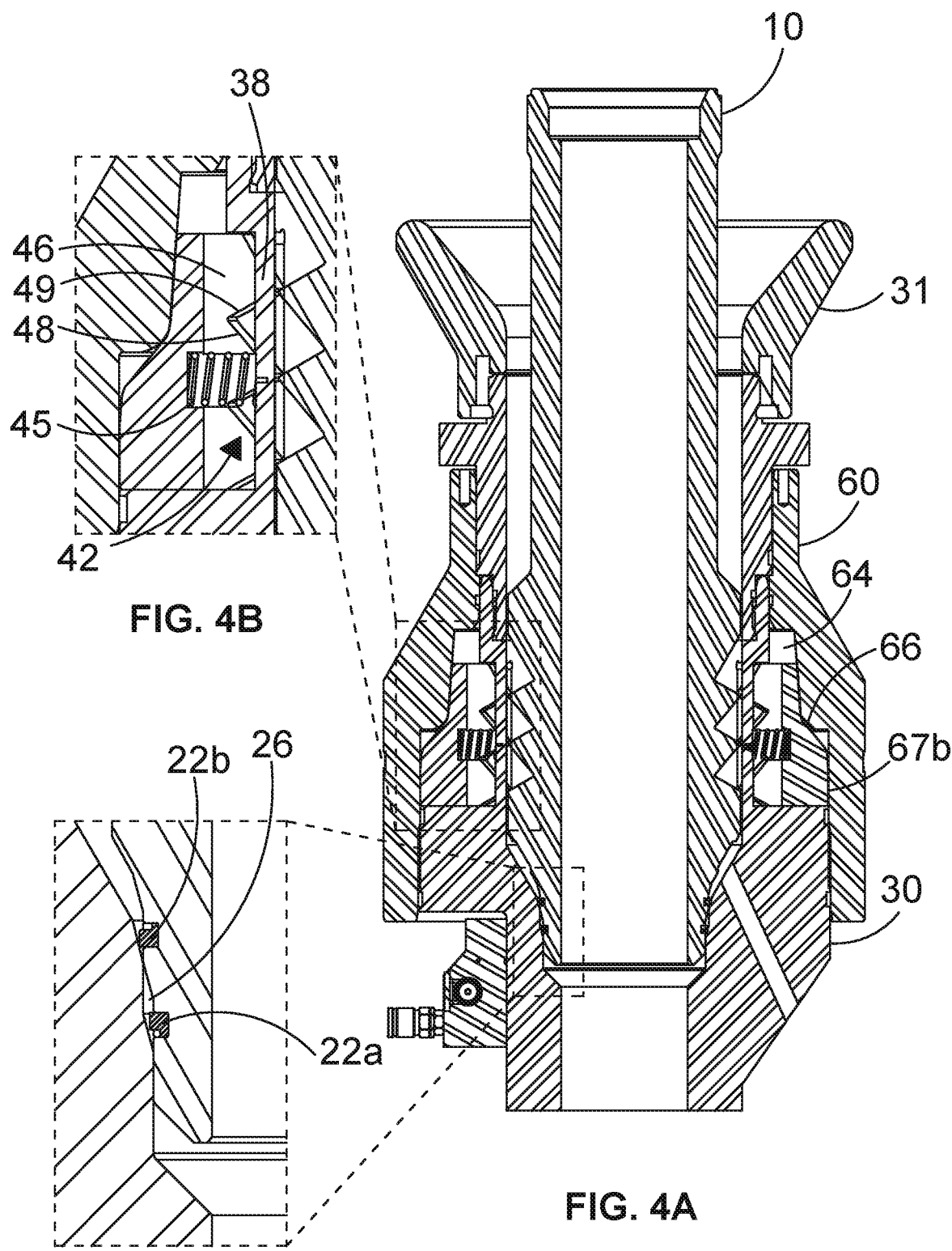
FIGS. 4A, 4B and 4C are respectively section and detailed section views of the connection assembly shown in FIG. 1A which illustrate the upper body landed, but not yet locked, in the bore of the lower body.
Figure 5B:
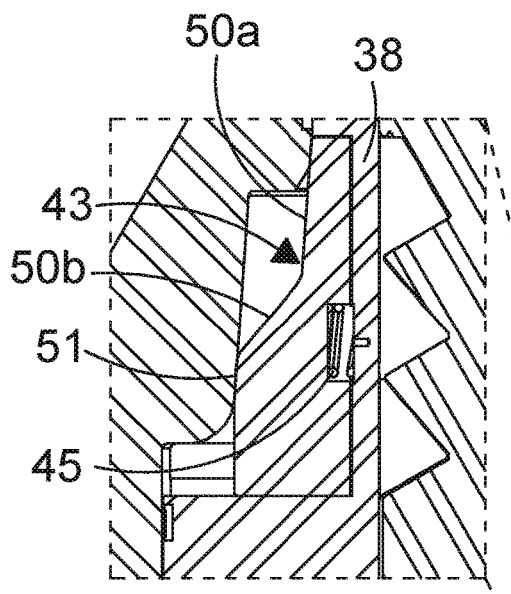
FIGS. 5A, 5B, 5C and 5D are respectively section and detailed section views of the connection assembly shown in FIG. 1A which illustrate the upper body locked in the bore of the lower body, where
Figure 5A:
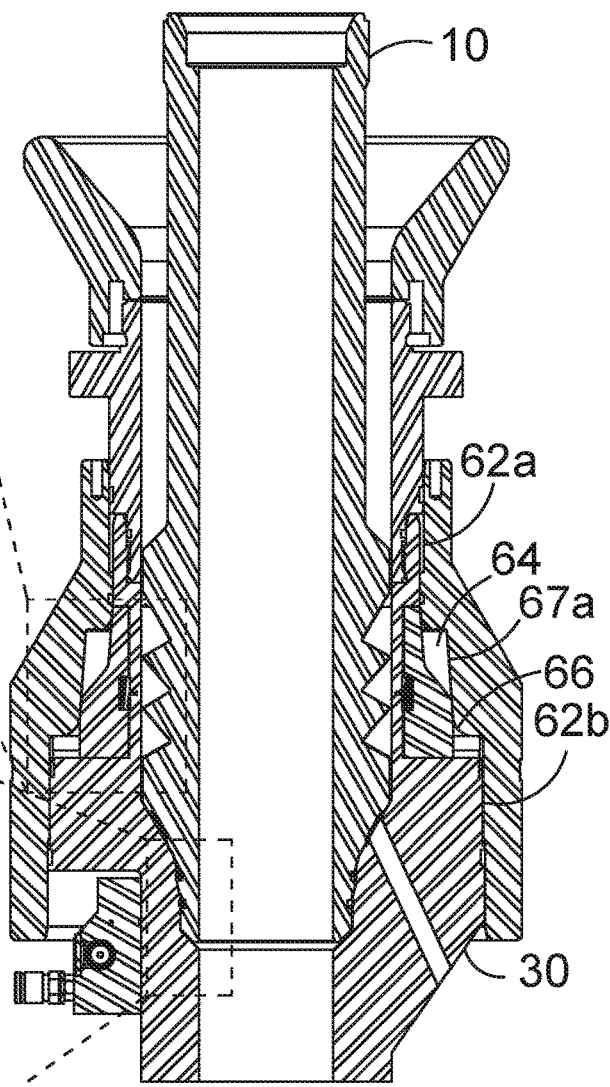
Figure 5C:
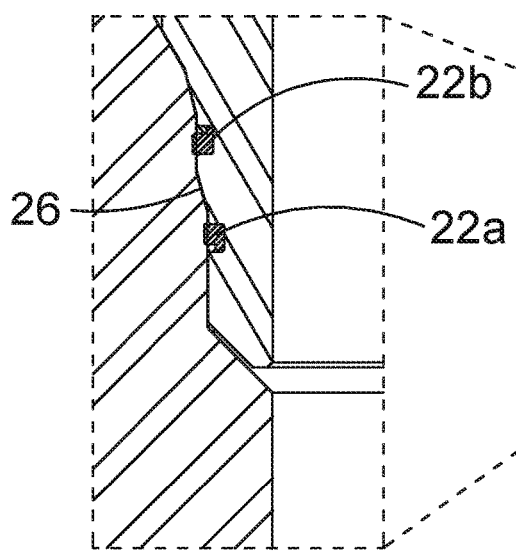

The piston sleeve 60 slides axially over the outer surface of the lower body 30 between an unlocked position, best seen in FIG. 4A, and a locked position, best seen in FIG. 5A. In the unlocked position, the piston sleeve is positioned axially closer to the entry guide 31 at the first axial end of the lower body 30, and in the locked position, the piston sleeve is positioned axially further away from the entry guide than when in the unlocked position.

In this example the lower body 30 also comprises a vent tube 39, which is a conduit joining the bore of the lower body to an opening in the outer surface of the lower body. The vent tube 39 is orientated at a relatively shallow angle relative to the axis of the lower body 30, such that when the lower body is connected to a wellhead or other fixed structure, the opening of the vent tube on the outer surface of the lower body is below the opening of the vent tube in the bore of the lower body.

Figure 2B:
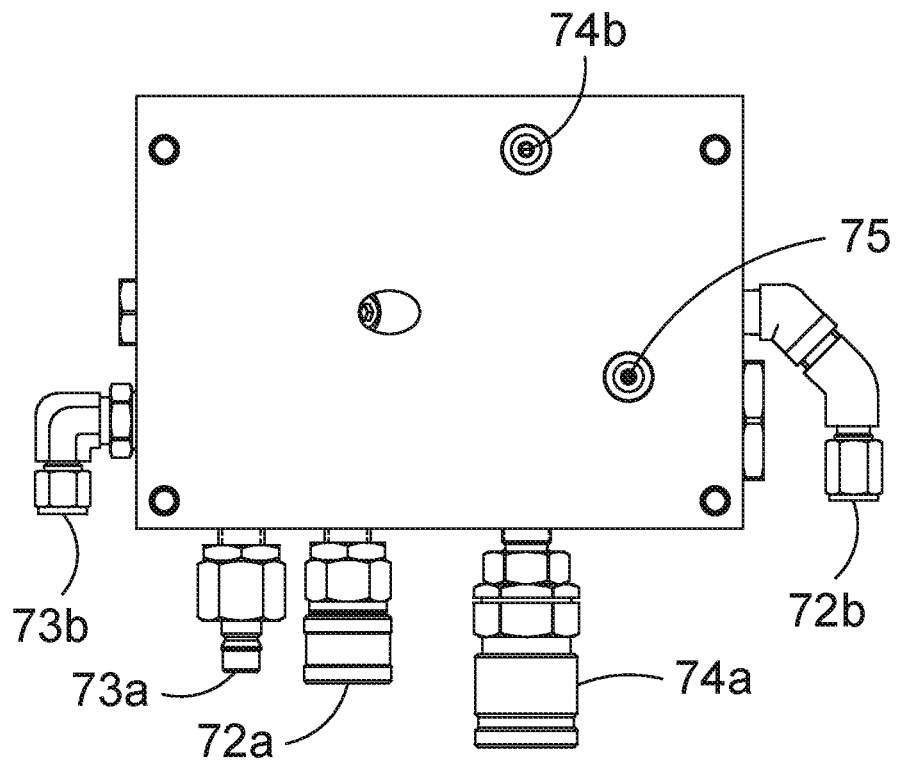

In this example a manifold block 70 is mounted on the outer surface of the lower body 30, as shown in FIG. 1A. As best seen in FIGS. 2A and 2B, the manifold block 70 has two close ports 72a, 72b for actuating the piston sleeve 60 from the unlocked position to the locked position, and two open ports 73a, 73b for actuating the piston sleeve from the locked position to the unlocked position. In this example a switched hydraulic supply able to supply hydraulic fluid pressurised to 3,000 psi is connected to respective close and open ports 72a, 73a, while the corresponding close and open ports 72*b*, 73*b* are connected to the sealed cavities 62*a*, 62*b* of the piston sleeve 60 using looped jumper hoses.

Figure 5D:
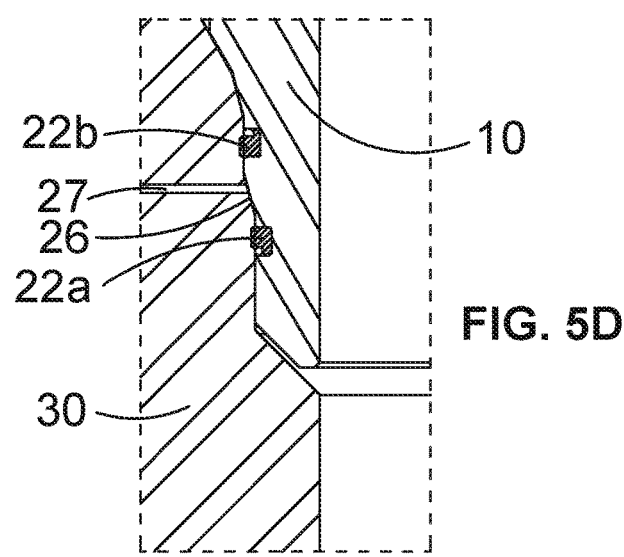

The manifold block 70 also has a test port 74*a* which is connected to a second hydraulic supply able to supply hydraulic fluid pressurised at up to e.g. 15,000 psi. The test port 74*a* is in fluid communication with test port 74*b*, which is disposed on a rear surface of the manifold block 70 as shown in FIG. 2B, which is mounted on the outer surface of the lower body 30. The test port 74*b* seals against the opening of fluid channel 27 (seen in FIG. 5D) which connects to the fluid chamber 26 formed between the first and second seals of the upper body 10 when the upper body is seated and locked in the lower body 30. The rear surface of the manifold block 70 also has a bore port 75, which in this example seals against the opening of a second fluid channel (not shown in the Figures) which is in fluid communication with the bore of the lower body 30.

Figure 3A:
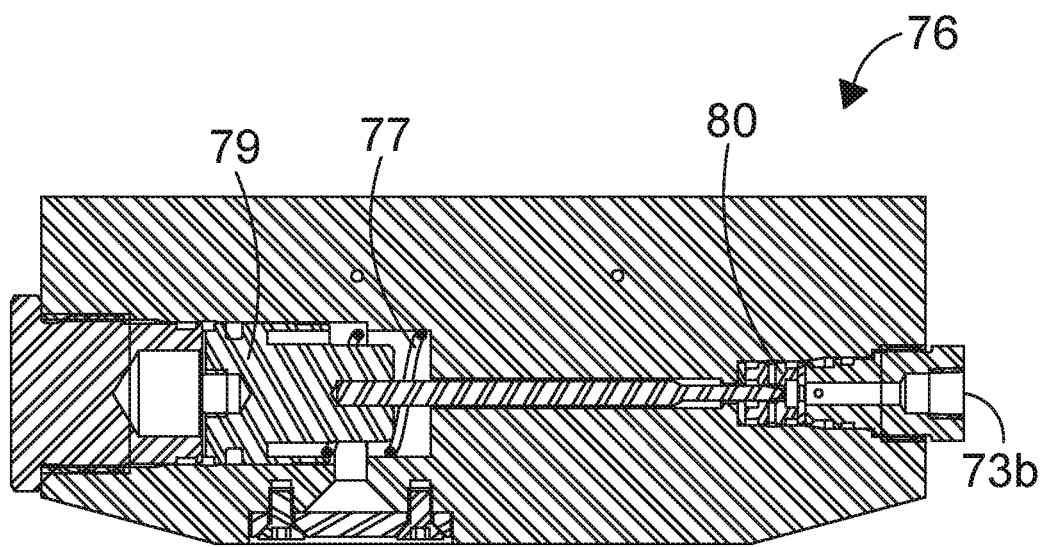
FIGS. 3A and 3B are section views of the interlock device of the manifold block shown in FIGS. 2A and 2B.
Figure 3B:
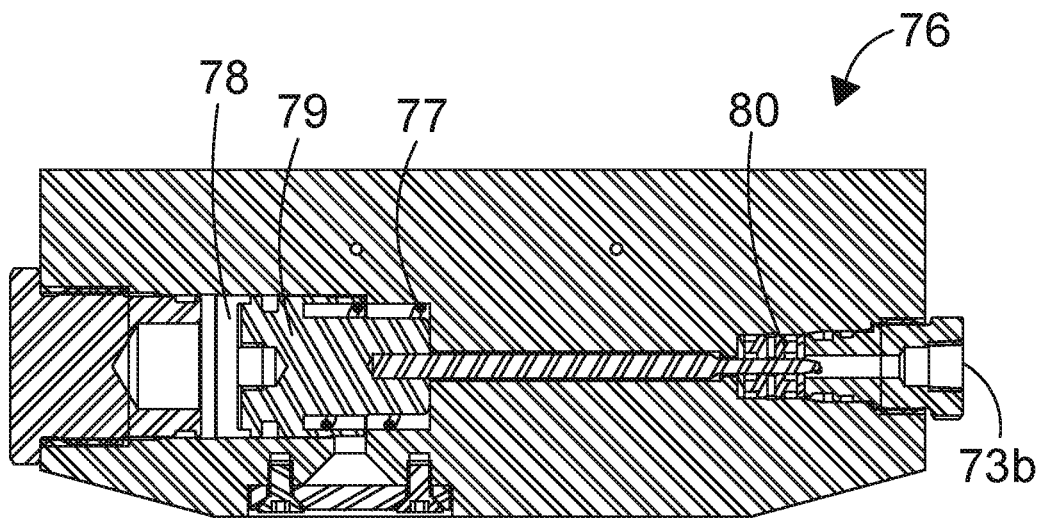

In this example the manifold block 70 contains an internal check valve between the close ports 72*a*, 72*b*, and an interlock device 76, shown in FIGS. 3A and 3B, between the open ports 73*a*, 73*b*. The check valve allows pressurised hydraulic fluid to pass from close port 72*a* to close port 72*b* to actuate the piston sleeve 60 from the unlocked position to the locked position. Once the piston sleeve 60 is in the locked position, the check valve retains pressurised hydraulic fluid in the fluid line i.e. in the looped jumper hose between the manifold block 70 and the piston sleeve, preventing the piston sleeve from being released from the locked position. The interlock device 76 comprises a spring 77 and piston 79 disposed within a chamber 78. In this example the chamber 78 is in fluid communication with the bore port 75 on the rear surface of the manifold block, and so the pressure in the chamber 78 is generally the same as the pressure in the bore of the lower body 30.

The assembly sequence of the upper body 10 and lower body 30 is shown generally in FIGS. 4A-4O and 5A-5D. The upper body 10 is initially introduced into the entry guide 31 of the lower body 30. As shown in FIG. 4A, the bore of the entry guide 31 narrows to join the bore of the lower body 30, which facilitates correcting any minor radial displacement of the axis X of the upper body 10 relative to the axis of the lower body as the upper body enters the bore of the lower body. When the first of the flattened protrusions 14*a* on the outer surface of the upper body 10 has passed into the bore of the lower body 30, the axes of the upper and lower bodies are substantially aligned, and further radial displacement of the upper body relative to the lower body is prevented. The upper body 10 is then further moved, or pushed, axially into the bore of the lower body 30, until the locking profile 12 on the outer surface of the upper body is approximately axially aligned with the windows 36 and locking keys 40 of the lower body, at which point the seals 22*a*, 22*b* land, or in other words make first contact, with the sealing surface 32 of the lower body.

As is best seen by comparing FIGS. 4C and 5O, further axial movement of the upper body 10 into the bore of the lower body 30 is necessary after the seals 22*a*, 22*b* have landed, before the upper body is seated in the bore of the lower body. As shown in FIG. 4O, the portions of the sealing surface 32 of the lower body on which the seals 22*a*, 22*b* land are substantially axis-parallel, and correspond with the axis-parallel surfaces 25*a*, 25*b* of the upper body 10 in which the seals 22*a*, 22*b* are disposed. Therefore, in this example, once the seals 22*a*, 22*b* have landed and are initially compressed to deny fluid passage between the outer surface of the upper body 10 and the bore of the lower body 30, the seals 22*a*, 22*b* are not exposed to any significant additional radial compression as the upper body is moved, or pushed, toward its final seated position.

As also seen in FIG. 4O, once the seals 22*a*, 22*b* have landed and have been compressed between the outer surface of the upper body 10 and the bore of the lower body 30, a fluid chamber 26 is formed between the seals 22*a*, 22*b*. In this example the volume of the fluid chamber 26 is larger when the seals 22*a*, 22*b* have initially landed, as shown in FIG. 4C, compared to the volume of the fluid chamber when upper body is seated in the bore of the lower body, as shown in FIG. 5O. In other examples, the volume of the fluid chamber 26 may remain substantially constant as the upper body is moved, or pushed, toward its final seated position. Also in this example, the reduction of volume of the sealed fluid chamber 26 causes an increase in pressure within the fluid chamber 26 as the upper body is seated, which in this example can be vented to the manifold block 70 through fluid channel 27 which connects the bore port 75 of the manifold block to the fluid chamber 26.

Figure 6:
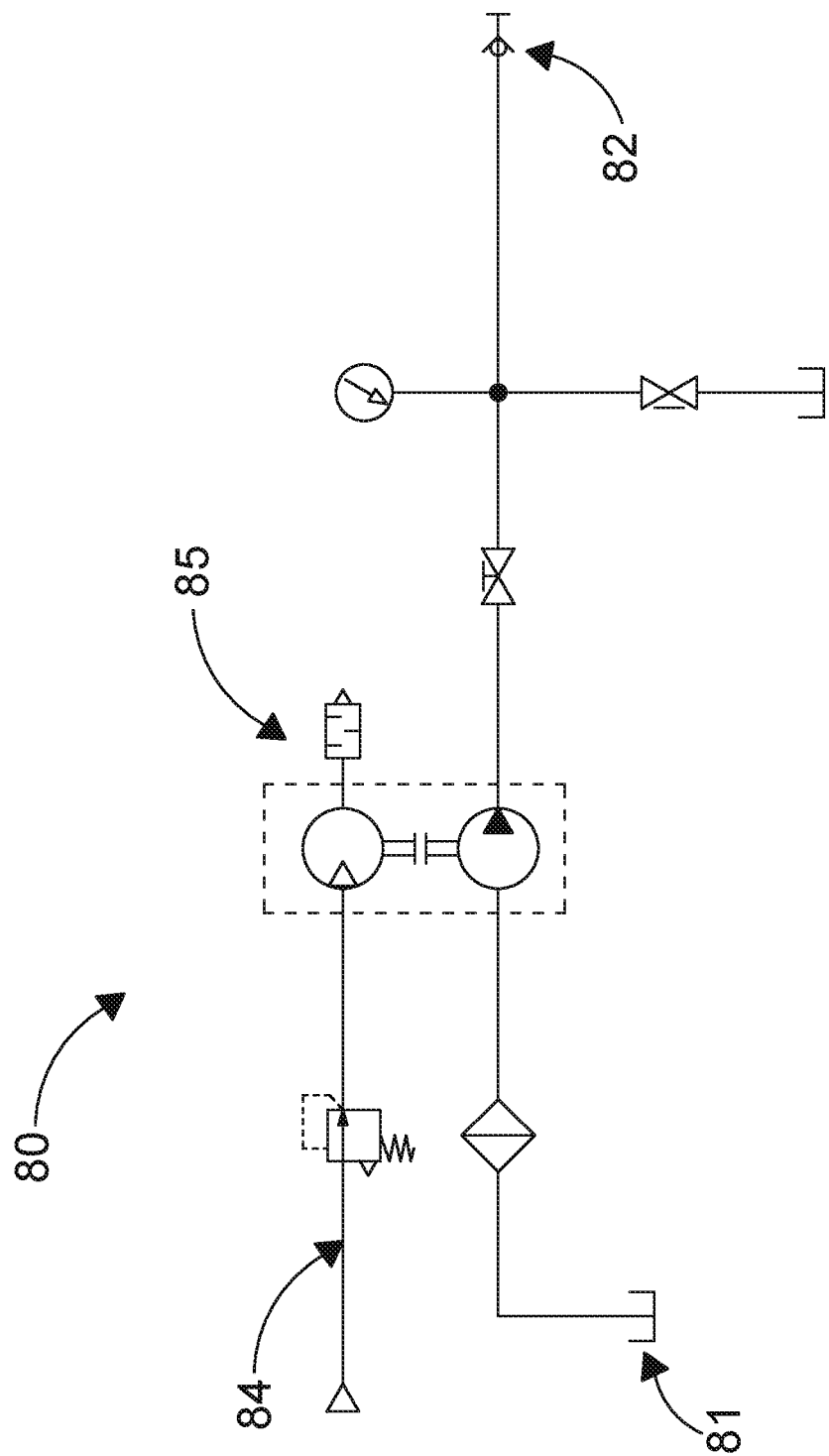
FIG. 6 shows a typical schematic of a pressure amplifier incorporated into one example of the connection assembly of FIGS. 1A-1C.

FIG. 6 shows in schematic format a typical circuit for a pressure amplifier 80 used with the connection assembly. The pressure amplifier 80 of FIG. 6 has a fluid inlet 81 admitting hydraulic fluid from a supply reservoir, and a fluid outlet 82 connected to the manifold block 70 (e.g. via the test port 74*a*) to inject fluid from the outlet 82 into the chamber 26, through the fluid channel 27 (see FIG. 5D). The pressure amplifier is powered by a compressed gas line 84 acting on a drive circuit of a pump 85 to increase the pressure of hydraulic fluid flowing through the fluid inlet 81 before passing the fluid through the fluid outlet 82 at a higher pressure than at the fluid inlet 81, typically many times higher than the fluid pressure at the fluid inlet. The pump 85 amplifies the pressure of the hydraulic fluid passing between the inlet 81 and outlet 82 by 150× in this example, and typical examples can operate at ratios at least more than 10×, e.g. 20, 30, 40, 50, 60 or more or beyond 150, e.g. 200, 300 or possibly more.

Once the upper body 10 is seated in the bore of the lower body 30, or in other words, in this example, when the seating face 28 of the upper body has come into contact with the seat 34 of the lower body, the piston sleeve 60 is actuated to drive the locking keys 40 into engagement with the locking profile 12 of the upper body 10. Pressurised hydraulic fluid is driven into close port 72*a* of the manifold block 70, and passes through the check valve in the manifold block to close port 72*b*. The hydraulic fluid then flows through a first jumper hose (not shown in the Figures) to sealed cavity 62*a* between the inner surface of the piston sleeve and the outer surface of the lower body 30. Increased hydraulic pressure in sealed cavity 62*a* causes the volume of the sealed cavity 62*a* to increase, which drives the piston sleeve 60 axially away from the entry guide 31. As the sliding movement of the piston sleeve 60 over the outer surface of the lower body 30 continues, the driving face 66 of the inner surface of the piston sleeve slides first over the first tapered driving face 50*a* of the locking keys 40, then over the second tapered driving face 50*b* of the locking keys, and finally over the axis-parallel face 51 of the locking keys.

As the driving face 66 of the piston sleeve 60 slides over the tapered driving faces 50*a*, 50*b* of the locking keys 40, axial movement of the piston sleeve is translated into radially inward movement of the locking keys. The locking keys 40 are prevented from axial movement by the axially-orientated faces of the recesses 37 and windows 36 of the lower body 30, within which the locking keys are fitted. In other words, the locking keys have a radial sliding fit within the recesses and windows of the lower body. When the driving face 66 of the piston sleeve 60 slides over the less steeply tapered driving faces 50a of the locking keys 40, axial movement of the piston sleeve 60 causes the radially inward movement of the locking keys to be more gradual than when the driving face of the piston sleeve slides over the more steeply tapered driving faces 50b of the locking keys.

The radially inward movement of the locking keys 40 toward the locking profile 12 of the upper body causes the inner faces 42 of the locking keys to radially overlap with the locking profile of the upper body. The teeth 46 of the locking keys 40 begin to move into the recesses 15 in the locking profile of the upper body. As is best seen in FIG. 4A, the tips of the teeth 46 are not axially aligned with the middle of the recesses 15 of the locking profile 12, but instead are only slightly axially separated from the peaks of the protrusions 14b of the locking profile. Therefore, as the locking keys 40 approach the locking profile 12, the more steeply tapered faces 49 of each tooth 46 i.e. those tapered at an angle of more than 45 degrees, come into contact with the more steeply tapered lower faces 16 of the recesses 15 of the locking profile. As the locking keys 40 are moved toward the locking profile 12, the tapered faces 49 of each tooth 46 slide over the tapered lower faces 16 of the locking profile. Since the axial position of the locking keys 40 is fixed, the recesses 15 of the locking profile 12 must be axially displaced in order to accommodate the teeth 46 entering the recesses 15 of the locking profile. Therefore, as the locking keys 40 move radially toward the locking profile 12, the upper body 10 is driven axially further into the bore of the lower body 30, until the upper body is seated within the bore of the lower body, as shown in FIGS. 5A-5D (contrast FIGS. 4C and 5C).

When the upper body 10 is seated within the bore of the lower body 30, the driving face 66 of the piston sleeve 60 can slide over the axis-parallel faces 51 of the locking keys 40, in order to lock the position of the locking keys. The axial movement of the piston sleeve 60 from the unlocked position to the locked position is then complete, and the supply of pressurised hydraulic fluid into the close port 72a of the manifold block 70 can be halted. The check valve within the manifold block 70 now acts as a one-way valve, and retains pressurised hydraulic fluid at substantially the same pressure as that used to actuate the piston sleeve 60 within the sealed cavity 62a of the piston sleeve. In this way, the piston sleeve 60 remains in the locked position even after the supply of pressurised hydraulic fluid into the close port 72a of the manifold block 70 is halted.

Before pressurising the bore of the connected upper and lower bodies 10, 30, the fluid chamber 26 is first pressurised by driving pressurised hydraulic fluid at between 10,000 and 15,000 psi from the pressure amplifier 80 into the test port 74a of the manifold block 70. The pressurised hydraulic fluid then passes through fluid channel 27 to the fluid chamber 26, so that the pressure in the fluid chamber 26 is substantially the same as the pressure of the supply of hydraulic fluid. Pressurising the fluid chamber 26 to between 10,000 and 15,000 psi allows the integrity of the seals 22a, 22b to be tested and verified prior to pressurising the bore of the connected upper and lower bodies 10, 30, and also produces axial thrust on the upper body 10 out of the bore of the lower body 30. A pressure of 10,000 to 15,000 psi (in this example) produces an upward axial thrust on the upper body 10 that exceeds the downward force due to gravity of the upper body 10 on the lower body 30, so that if the upper and lower bodies 10, 30 are not securely connected, for example if the locking keys 40 have not properly engaged with the locking profile 12 of the upper body, it is known that the upward axial thrust on the upper body 10 will cause the upper body to move out of the bore of the lower body. Significant movement of the upper body 10 out of the bore of the lower body 30 provides a clear visual indication that the upper and lower bodies are not securely connected, but even slight movement of the upper body sufficient to cause one or both of the seals 22a, 22b to separate from the bore of the lower body 30, will result in a pressure loss from the fluid chamber 26, although the seals can slide axially for a short distance against the axis-parallel surfaces of the lower body 30. Therefore, by monitoring for any drop in pressure in the fluid chamber 26 when the locking device has been engaged, an operator may positively establish that the locking keys 40 are in fact properly engaged with the upper body 10 in the case that pressure in the fluid chamber 26 is maintained, or that the upper and lower bodies 10, 30 are not securely connected in the case that pressure is seen to be leaking from the fluid chamber 26.

If the upper and lower bodies 10, 30 are securely connected, the axial thrust produced on the upper body 10 by the fluid pressure in the fluid chamber 26 will drive the upper body against the locking keys 40, causing load to be developed between the upper body and the locking keys. This can be useful, for example, in reducing or minimising flow-induced vibration of the upper body 10 against the locking keys 40 during normal well operations.

Once the fluid chamber 26 has been pressurised in this way, and any pre-operating tests or checks have been completed, either including or in addition to those described previously, the bore of the connected upper and lower bodies 10, 30 can be pressurised. The pressure in the fluid chamber 26 is maintained during normal well operations in order to maintain the load or tension between the upper body 10 and the locking keys 40.

The sequence of steps for disconnecting the upper and lower bodies 10, 30 is generally the reverse of the process to connect the upper and lower bodies described previously. Before attempting to disconnect the upper and lower bodies 10, 30, the pressure in fluid chamber 26 is optionally released by e.g. venting pressurised hydraulic fluid from test port 74a of the manifold block 70. However, the interlock device 76 and check valve within the manifold block 70 act to prevent unintended disconnection of the upper and lower bodies 10, 30 while the bore of the upper and lower bodies remains pressurised. Disconnecting the upper and lower bodies 10, 30 requires supplying pressurised hydraulic fluid to the piston open port 73a in order to actuate the piston sleeve 60 from the locked position to the unlocked position. If the bore is pressurised, bore pressure is also present in the chamber 78 of the interlock device 76, which overcomes the biasing force of the spring 77 and drives the piston 79 out of the chamber 78, as shown in FIG. 3B. The stem of the piston 79 is therefore pushed onto valve seat 80 of piston open port 73b, closing the fluid pathway between the piston open ports 73a, 73b. Therefore, pressurised hydraulic fluid cannot pass from piston open port 73a to piston open port 73b when the bore is pressurised, and the piston sleeve 60 remains fixed in the locked position.

If the bore of the lower body 30 is not pressurised, the spring 77 biases the piston 79 into the chamber 78, as shown in FIG. 3A. The stem of the piston 79 is therefore retracted from valve seat 80 of piston open port 73b, and pressurised hydraulic fluid entering piston open port 73a can pass through to piston open port 73b. The hydraulic fluid then flows through a second jumper hose (not shown in the Figures) to sealed cavity 62b between the inner surface of the piston sleeve 60 and the outer surface of the lower body 30. Increased hydraulic pressured in sealed cavity 62b causes the volume of the sealed cavity 62b to increase, which drives the piston sleeve 60 axially toward the entry guide 31. At the same time, in the absence of bore pressure, the interlock device 76 also actuates the check valve within the manifold block 70, which allows the pressurised hydraulic fluid still present in the sealed cavity 62a to back-flow through the check valve, releasing the pressure in the sealed cavity 62a. Hydraulic fluid in the sealed cavity 62a therefore no longer holds the piston sleeve 60 in the locked position, and will not oppose hydraulic fluid pressure in the sealed cavity 62b of the piston sleeve from moving the piston sleeve from the locked position to the unlocked position.

As the piston sleeve 60 moves axially toward the unlocked position, the locking keys 40 are free to move radially within the windows 36 of the lower body 30. The springs 54 disposed within the circular recess 45 of each locking key 40 urge the locking keys in a radially outward direction away from the locking profile, such that the teeth 46 of the locking keys are no longer engaged with recesses 15 of the locking profile. The upper body 10 is then free to be moved, or pulled, out of the bore of the lower body 30.

The invention claimed is:

1. A connection assembly for an oil or gas well adapted to contain pressurized fluid within the well, the connection assembly comprising:
    a first tubular having an axis and a second tubular having an axis, one of the first and second tubulars having a coupling device adapted to connect to the well;
    the first tubular having a bore with a first end adapted to receive the second tubular, the second tubular being adapted to connect to the first tubular when the second tubular is received within the first end of the bore of the first tubular;
    a locking device adapted to lock the first and second tubulars together, the locking device comprising a key disposed in a window of the first tubular and being hydraulically actuated to move radially with respect to the axis into engagement with a locking profile on the outer surface of the second tubular, wherein the key is movable radially between a radially retracted configuration where the key is radially disengaged from the locking profile of the second tubular, and a radially extended configuration where the key is radially engaged with the locking profile of the second tubular;
    first and second seals disposed on at least one of the first and second tubulars, each of the first and second seals being adapted to form a seal between an outer surface of the second tubular and an inner surface of the first tubular when the second tubular is received within the bore of the first tubular and the first and second tubulars are locked together, to create a fluid chamber defined by the outer surface of the second tubular, the inner surface of the first tubular and the first and second seals;
    wherein the second seal is axially and radially spaced from the first seal; and
    wherein the connection assembly comprises a hydraulic pressure system adapted to drive hydraulic fluid into the fluid chamber to urge the second tubular out of the first tubular when the first and second seals are compressed between the first and second tubulars.

2. A connection assembly as claimed in claim 1, wherein the locking device is held in a static axial position relative to the first tubular, and wherein driving hydraulic fluid into the fluid chamber is adapted to urge the second tubular against the locking device.

3. A connection assembly as claimed in claim 1, wherein between the first and second seals, at least a portion of the outer surface of the second tubular between the first and second seals is tapered radially outward from the first seal to the second seal at an angle to the axis of the second tubular.

4. A connection assembly as claimed in claim 1, wherein the hydraulic system includes a pressure amplifier having a fluid inlet and a fluid outlet connected to a fluid line leading to the fluid chamber, wherein the pressure amplifier is adapted to increase the pressure of fluid flowing through the fluid inlet before passing the fluid through the fluid outlet into the pressure chamber at a higher pressure than the fluid pressure at the fluid inlet of the pressure amplifier.

5. A connection assembly as claimed in claim 1, wherein the first and second seals engage and slide axially against axis parallel portions of the first tubular when the seals are compressed between the first and second tubulars.

6. A connection assembly as claimed in claim 1, wherein the locking device comprises a hydraulic locking device, and wherein the hydraulic pressure system for driving hydraulic fluid into the fluid chamber is independent of a hydraulic supply for the hydraulic locking device.

7. A connection assembly as claimed in claim 6, wherein the working pressure of the hydraulic pressure system for driving hydraulic fluid into the fluid chamber is greater than the working pressure of the hydraulic supply for the hydraulic locking device.

8. A connection assembly as claimed in claim 6, wherein the working pressure of the hydraulic pressure system for driving hydraulic fluid into the fluid chamber is greater than 115% of the maximum working pressure of the well.

9. A connection assembly as claimed in claim 5, wherein the hydraulic pressure system for driving hydraulic fluid into the fluid chamber causes a force in a first direction on the second tubular that is greater than a force in an opposing second direction due to gravity on the second tubular.

10. A connection assembly as claimed in claim 1, wherein the first and second seals each have a sealing area, and wherein the sealing area of the second seal is 105-110% of the sealing area of the first seal.

11. A connection assembly as claimed in claim 1, wherein a radially inner face of the key adapted to engage the locking profile of the second tubular has a plurality of radially inwardly extending teeth, each tooth comprising a first face arranged at a first angle of less than 45 degrees relative to the axis of the first tubular and a second face arranged at a second angle of more than 45 degrees relative to the axis of the first tubular, wherein the teeth on the key are received within respective recesses on the locking profile of the second tubular, each recess having a first face arranged at a first angle of less than 45 degrees relative to the axis of the first tubular, and a second face arranged at an angle of more than 45 degrees relative to the axis of the first tubular.

12. A method of making connections in an oil or gas well connection assembly, the connection assembly comprising:
    first and second tubulars each having an axis, one of the first and second tubulars having a coupling device adapted to connect to the well, the first tubular having a bore with a first end adapted to receive the second tubular;
    a locking device adapted to lock the first and second tubulars together, wherein the locking device comprises a key disposed in a window of the first tubular and adapted to move radially with respect to the axis to engage with a locking profile on the outer surface of the second tubular, wherein the method includes driving hydraulic fluid into the locking device to drive the key radially into the locking profile of the second tubular;

first and second seals disposed on at least one of the first and second tubulars, each of the first and second seals being adapted to form a seal between an outer surface of the second tubular and an inner surface of the first tubular when the second tubular is received within the bore of the first tubular and the first and second tubulars are locked together, to create a fluid chamber defined by the outer surface of the second tubular, the inner surface of the first tubular and the first and second seals;

wherein the second seal is axially and radially spaced from the first seal;

wherein the method comprises receiving the second tubular in the first tubular, engaging the locking device to lock the first and second tubulars together, and driving hydraulic fluid into the fluid chamber to urge the second tubular out of the first tubular.

13. A method as claimed in claim 12, wherein the method includes testing the integrity of the seals formed by the first and second seals by driving hydraulic fluid into the fluid chamber when the locking device is engaged.

14. A method as claimed in claim 12, wherein the method includes urging the second tubular in an axial direction against the locking device by driving hydraulic fluid into the fluid chamber when the locking device is engaged.

15. A method as claimed in claim 12, wherein the method includes maintaining fluid pressure in the fluid chamber when the locking device is engaged.

16. A method as claimed in claim 15, wherein the method includes maintaining fluid pressure in the fluid chamber when the locking device is engaged at a pressure greater than the pressure in the bore of the connection assembly.

17. A method as claimed in claim 16, wherein the method includes maintaining fluid pressure in the fluid chamber when the locking device is engaged at a pressure greater than 115% of the maximum working pressure of the well.

18. A method as claimed in claim 12, including compressing the first and second seals against axis parallel portions of the inner surface of the first tubular and the outer surface of the second tubular, and sliding the first and second seals against the axis parallel portions while the seals are compressed to seal the bore of the first tubular during relative axial movement of the first and second tubulars.

19. A method as claimed in claim 12, wherein the hydraulic system includes a pressure amplifier having a fluid inlet and a fluid outlet connected to a fluid line leading to the fluid chamber, and wherein the method includes amplifying the pressure of fluid flowing through the fluid inlet before passing the fluid through the fluid outlet into the pressure chamber at a higher pressure than the fluid pressure at the fluid inlet of the pressure amplifier.

20. A connection assembly for an oil or gas well adapted to contain pressurized fluid within the well, the connection assembly comprising:

a first tubular having an axis and a second tubular having an axis, one of the first and second tubulars having a coupling device adapted to connect to the well;

the first tubular having a bore with a first end adapted to receive the second tubular, the second tubular being adapted to connect to the first tubular when the second tubular is received within the first end of the bore of the first tubular;

a locking device adapted to lock the first and second tubulars together, the locking device comprising a key disposed in a window of the first tubular and being hydraulically actuated to move radially with respect to the axis into engagement with a locking profile on the outer surface of the second tubular, wherein the key is movable radially between an unlocked configuration where the key is disengaged from the locking profile of the second tubular, and a locked configuration where the key is engaged with the locking profile of the second tubular;

first and second seals disposed on at least one of the first and second tubulars, each of the first and second seals being adapted to form a seal between an outer surface of the second tubular and an inner surface of the first tubular when the second tubular is received within the bore of the first tubular and the first and second tubulars are locked together, to create a fluid chamber defined by the outer surface of the second tubular, the inner surface of the first tubular and the first and second seals;

wherein each of the first and second seals engages and is adapted to slide axially between respective axis parallel portions of the first and second tubulars when the seals are compressed between the first and second tubulars:

wherein the connection assembly includes a fluid line connecting a port with the fluid chamber;

wherein the second seal is axially and radially spaced from the first seal;

wherein the connection assembly comprises a hydraulic pressure system adapted to drive hydraulic fluid into the fluid chamber to urge the second tubular out of the first tubular when the first and second seals are compressed between the first and second tubulars;

wherein the hydraulic system includes a pressure amplifier having a fluid inlet and a fluid outlet connected to a fluid line leading to the fluid chamber, wherein the pressure amplifier is adapted to increase the pressure of fluid flowing through the fluid inlet before passing the fluid through the fluid outlet into the pressure chamber at a higher pressure than the fluid pressure at the fluid inlet of the pressure amplifier; and wherein the working pressure of the hydraulic pressure system for driving hydraulic fluid into the fluid chamber is greater than 115% of the maximum working pressure of the well.

\* \* \* \* \*